United States Patent
Sharaby

Patent Number: 4,748,218
Date of Patent: May 31, 1988

[54] SHORTSTOPPING FREE RADICAL POLYMERIZATION OF OLEFINIC MONOMERS

[75] Inventor: Zaev Sharaby, Cleveland Heights, Ohio

[73] Assignee: The B. F. Goodrich Company, Akron, Ohio

[21] Appl. No.: 728,549

[22] Filed: Apr. 29, 1985

[51] Int. Cl.$^4$ .......... C08F 2/38; C08F 114/06; C08F 2/02; C08F 2/18

[52] U.S. Cl. .......... 526/84; 526/82; 526/210; 526/230.5; 526/344; 526/344.1; 526/344.2; 524/384; 524/567

[58] Field of Search .......... 428/402; 526/83, 84, 526/85, 344, 344.2, 344.1, 82, 210, 230.5; 524/567

[56] References Cited

U.S. PATENT DOCUMENTS

| | | | |
|---|---|---|---|
| 2,469,017 | 5/1949 | Sundet | 526/83 X |
| 3,575,912 | 4/1971 | Albert | 526/83 X |
| 3,862,066 | 1/1975 | Reiter et al. | 526/84 X |
| 4,346,202 | 8/1982 | Cohen | 526/84 X |
| 4,361,683 | 11/1982 | Dodd et al. | 526/84 |
| 4,590,301 | 5/1986 | Lim et al. | 568/633 |
| 4,619,978 | 10/1986 | Reid | 526/84 |

FOREIGN PATENT DOCUMENTS

| | | | |
|---|---|---|---|
| 0003681 | 1/1977 | Japan | 526/83 |

OTHER PUBLICATIONS

Schildknecht, C. E. "Polymerizations in Bulk" in *Polymer Processes*, Schildknecht, C. E. (ed.) Interscience Publishers Inc., N.Y. (1956) pp. 37 and 62.

Blackley, D. C. *Emulsion Polymerization*, Halsted Press, N.Y. (1975) pp. 406–411.

H. L. Williams, "Polmerizations in Emulsion" in *Polymer Processes*, C. E. Schildknecht (ed.) pp. 111–171 (1956).

Primary Examiner—Joseph L. Schofer
Assistant Examiner—F. M. Teskin
Attorney, Agent, or Firm—Joe A. Powell

[57] ABSTRACT

It has been found that substituted hydroquinones function as a shortstop agent in the polymerization of vinyl monomers. The substituted hydroquinones have the formula:

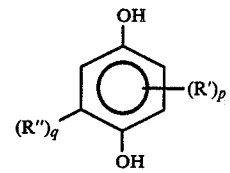

wherein

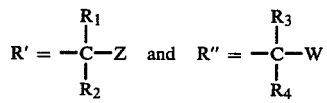

wherein p is 1 or 2 and q is 0 or 1; provided that p+q=1 or 2. The groups $R_1$, $R_2$, $R_3$, $R_4$, Z and W are defined hereafter.

The compounds 2,5-di-t-amylhydroquinone and 2,5-di-t-butylhydroquinone are particularly desirable as shortstop agents in the polymerization of vinyl chloride.

19 Claims, No Drawings

SHORTSTOPPING FREE RADICAL POLYMERIZATION OF OLEFINIC MONOMERS

BACKGROUND OF THE INVENTION

In the polymerization of olefinic monomers having a terminal $CH_2=C<$ grouping such as vinyl chloride with free radical catalysts, particularly those containing oxygen, it is generally desirable to stop the reaction after the polymerization has reached a predetermined state in order to obtain stable, uniform polymers. Sometimes it is also necessary to stop or slow down reactions that are proceeding at a faster rate than is desirable. Also, in many polymerization systems, it is often desirable to stop the polymerization reaction short of complete conversion so that an effective agent of some kind must be employed to stop the reaction quickly without adversely affecting the polymerization product. The problem is particularly acute when employing the more active catalysts that give extremely fast polymerization rates and with, for example vinyl chloride polymers that are subject to thermal degradation.

Polyvinyl chloride resins are also subjected to high temperature environments after the polymer is made. It is normal for the polymer to be subjected to steam stripping, drying, and processing operations all of which subject the polymer to some thermal degradation and are normally performed at a higher temperature than the polymerization temperature. Steam stripping can reach temperatures of about 140° C. and subject the polymer to degradation.

Polyvinyl chloride may be produced by the suspension, micro-suspension, or emulsion process whereby vinyl chloride monomer droplets are suspended and polymerized in an aqueous medium. Another polymerization method is to use a modified suspension process as is taught by U.S. Pat. No. 4,435,524 (incorporated herein by reference) wherein the aqueous medium is in a thickened state. This thickened aqueous suspension process produces spherical shaped resin particles which have obvious advantages. The resins spherical shape can be determined by comparing the ratio of the minor axis with the major axis using microscopic techniques well known in the art. A perfect circle would have a ratio of 1.0. The resins are considered spherical if they have a ratio greater than 0.9. Each of these processes present unique problems associated with shortstopping the polymerization reaction. Shortstop agents are normally employed in the typical suspension polymerization process to counteract this degradation and to control the resin properties. In the modified suspension process (thick aqueous medium), some shortstops that are effective for the normal suspension process will not work in the thickened medium. Apparently, they will not diffuse through the thickened medium and into the polymer. Also, resins which have low porosity are difficult to shortstop because of the difficulty in the shortstop agent diffusing into the low porosity resin.

A still further polymerization method is the bulk or mass process. The mass process normally has just the monomer(s) and initiator. Water is not present. The process depends on a two-stage polymerization. In the first stage, which is operated with strong agitation, the oil-soluble, free radical catalyst and the monomer are raised to the reaction temperature. Almost immediately, the solution becomes opalescent from formation of polymer chains, and as polymerization increases, these chains agglomerate and form small particles in the range of 0.1 micron. After about 10% conversion the liquid is transferred to a second vessel. This second vessel is horizontal and has a ribbon blender type of agitation that operates much more slowly; and in this vessel the particles are allowed to grow. The reaction medium goes through a gell state at about 30% conversion and then a wet powder state and finally a dry powder at about 50% conversion. The resin is stripped and dried in the polymerizer. The mass process leads to a resin which is free of an encapsulating skin which is also known as a pericellular membrane. Suspension process resins have a pericellular membrane, but mass process resins do not. Shortstop agents are not normally used in the mass process.

In the manufacture of homopolymers and copolymers of olefinic monomers, and particularly from vinyl halides and vinylidene halides, one of the most important aspects is reaction control during the entire course of the polymerization. This is related, directly or indirectly, to such things as demands on heat exchange equipment, reactions with such a fast rate that they become uncontrolled, formation of off-specification products, and the like. Accordingly, some means to terminate permanently or temporarily a polymerization, such as this, at any given time would be most desirable. When a polymerization plant experiences a loss of agitation or cooling ability, usually through power failure, these exothermic reactions can build up heat and pressure to the point of endangering workers and equipment. These out of control reactions must be stopped very quickly by use of what is known in the art as emergency shortstops. To be effective as an emergency shortstop, the shortstop must diffuse very quickly through the reaction medium and into the polymer.

Heretofore, various shortshopping agents have been employed to terminate the polymerization of monoolefinically unsaturated monomers. However, many of these shortstopping agents require large amounts to be effective or are toxic. Others operate by destroying the catalyst such as those disclosed in U.S. Pat. No. 3,637,632. Further, many of these shortstopping agents have been found to be ineffective in completely halting the polymerization or have been found to be effective only in such concentrations as result in discoloration of the polymer product. Free radical initiators used in the polymerization of polyvinyl chloride increase the rate of polymerization. However, these same initiators contribute to the degradation of the polymer during the stipping and drying operations that occur after polymerization.

It is a desirable goal to have an effective, non-toxic shortstop agent for shortstopping polymerization of olefinic monomers. It is desirable to have an effective non-toxic emergency shortstop. It would also be desirable to be able to shortstop and stabilize polyvinyl chloride made by the mass process and by the thickened aqueous suspension process.

SUMMARY OF THE INVENTION

It has been found that in the polymerization of vinyl monomers, either alone, or copolymerized with monomers having a terminal $CH_2=C<$ grouping, with a catalyst or catalyst system, the polymerization reaction is effectively stopped or slowed by the addition to the reaction mixture of at least one substituted hydroquinone having the formula

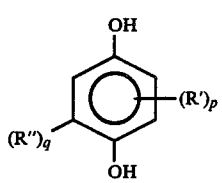

wherein

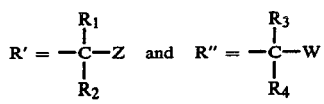

wherein p is 1 or 2 and q is 0 or 1; provided that p+q=1 or 2. The groups $R_1$, $R_2$, $R_3$, $R_4$ are either H, $CH_3$, or $C_2H_5$ and are identical or different. The groups Z and W may be identical or different and are either H, $C_1$ to $C_{12}$ hydrocarbon, $OR_5$, $SR_5$, phenyl, alkyl benzene, $C_nH_{2n+1-k}$—$(X)_t$—$R_6$ wherein n is an integer from 1 to 20, k=1 or 2, t=0 or 1, X=—O— or

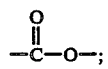

wherein $R_5$ and $R_6$ are H or $C_1$–$C_{12}$ hydrocarbon, CN, or $C_nH_{2n+1-k}$CN wherein n and k are as defined above.

Preferably the hydroquinone is a 2,5 hydroquinone having the formula

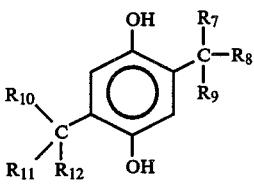

wherein $R_7$, $R_8$, $R_{10}$ and $R_{11}$ are identical or different and are either H, methyl, or ethyl. $R_9$ and $R_{12}$ are identical or different and are either H, or an alkyl having from 1 to about 12 carbon atoms. Preferably, $R_7$, $R_8$, $R_{10}$ and $R_{11}$ are methyl and $R_9$ and $R_{12}$ are either methyl or ethyl.

DETAILED DESCRIPTION

While the process of the present invention is applicable to any polymerization system normally employed to polymerize olefinic monomers wherein a free radical yielding catalyst is used, such as bulk, solution, aqueous suspension, micro-suspension, aqueous emulsion, batch or continuous, and the like, for simplicity of description the invention will be described as it is applicable to the polymerization of vinyl chloride to form polyvinyl chloride. It is understood, however, that this is merely intended in an illustrative sense.

The monomers which may be employed in the present invention include vinyl chloride and polymerizable olefinic monomers copolymerizable therewith having at least one terminal $CH_2=C<$ grouping such as the other vinyl halides and vinylidene halides, for example, vinyl bromide, vinylidene chloride, etc.; acrylic acid; esters of acrylic acid, such as methyl acrylate, ethyl acrylate, butyl acrylate, octyl acrylate, cyanoethyl acrylate, and the like; methacrylic acid; esters of methacrylic acid such as methyl methacrylate, butyl methacrylate and the like; nitriles such as acrylonitrile, methacrylonitrile, etc; acrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones, such as methyl vinyl ketone, etc.; vinyl naphthalene; allyl and vinyl chloroacetate; vinyl acetate; vinyl pyridine; and mixtures of any of these types of monomers and other olefinic monomers copolymerizable therewith including esters of maleic and fumaric acid, and the like; and other copolymerizable olefinic monomers of the types known to those skilled in the art. The present invention is particularly applicable to the polymerization of vinyl chloride, either alone, or in admixture with one or more other polymerizable olefinic monomers having at least one terminal $CH_2=C<$ grouping in amounts up to about 50% by weight of comonomer, preferably up to about 20% by weight of comonomer, based on the weight of the monomer mixture.

Among the catalysts or initiators that may be employed in the present process are the free radical yielding catalysts or initiators, such as the alkanoyl, aroyl, alkaroyl and aralkanoyl diperoxides and monohydroperoxides, azo compounds, peroxyesters, percarbonates, and the like. As examples of such catalysts, there may be named benzoyl diperoxide, lauryl diperoxide, diacetyl peroxide, cumene hydroperoxides, hydrogen peroxide, methyl ethyl ketone peroxide, diisopropylbenzene hydroperoxide, 2,4-dichlorobenzoyl peroxide, benzoyl peroxide, naphthoyl peroxide, lauroyl peroxide, acetyl cyclohexane sulfonyl peroxide, t-butyl perbenzoate, di-t-butyl perphathalate, diisopropyl peroxydicarbonate, di(sec-butyl) peroxydicarbonate, and the like, azo-bisisobutyronitrile, α,α'-azodiisobutyrate, and the like, etc. Found useful are lauroyl peroxide, di(2-ethyl hexyl) peroxydicarbonate, di-ethyl peroxydicarbonate, di(n-propyl) peroxydicarbonate, diisopropyl peroxydicarbonate, di(sec-butyl) peroxydicarbonate and acetyl cyclohexane sulfonyl peroxide. The choice of any particular free radical yielding catalyst is dictated in part by the particular monomer or monomers to be polymerized and by the color requirements of the polymer or copolymer to be produced. Further, more than one catalyst may be employed in the polymerization recipe. Usually, the amount of catalyst or catalysts employed will be in the range of about 0.005% to about 1% by weight, based on the weight of the monomer or monomers being polymerized. Preferably, the amount of catalyst(s) will be in the range of about 0.02% to about 0.10% by weight.

The shortstopping agents suitable for use in this invention are substituted hydroquinones having the formula:

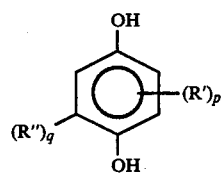

wherein

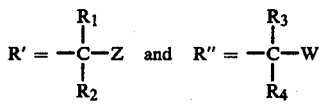

wherein p is 1 or 2 and q is 0 or 1; provided that p+q=1 or 2. The groups $R_1$, $R_2$, $R_3$, $R_4$ are either H, $CH_3$, or $C_2H_5$ and are identical or different. The groups Z and W may be identical or different and are either H, $C_1$ to $C_{12}$ hydrocarbon, $OR_5$, $SR_5$, phenyl, alkyl benzene, $C_nH_{2n+1-k}$—$(X)_t$—$R_6$ wherein n is an integer from 1 to 20, k=1 or 2, t=0 or 1, X=—O— or

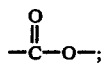

wherein $R_5$ and $R_6$ are H or $C_1$-$C_{12}$ hydrocarbon, CN, or $C_nH_{2n+1-k}CN$ wherein n and k are as defined above. The $C_1$ to $C_{12}$ hydrocarbon for Z, W, $R_5$ and $R_6$ may be straight or branched alkyl, $C_3$ to $C_{12}$ straight or branched alkenyl, or $C_3$ to $C_{12}$ cycloalkenyl.

Preferably the hydroquinone is a 2,5 hydroquinone having the formula

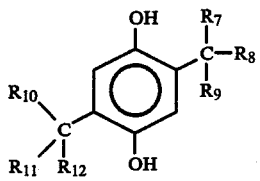

wherein $R_7$, $R_8$, $R_{10}$ and $R_{11}$ are identical or different and are either H, methyl, or ethyl. $R_9$ and $R_{12}$ are identical or different and are either H, or an alkyl having from 1 to about 12 carbon atoms. Preferably, $R_7$, $R_8$, $R_{10}$ and $R_{11}$ are methyl and $R_9$ and $R_{12}$ are either methyl or ethyl.

Examples of suitable preferred shortstops are 2,5-di-t-amylhydroquinone; 2,5-di-t-butyl hydroquinone, a material sold by Uniroyal Chemicals under the tradename of Naugard 451, and the like. Naugard 451 would conform to the above formula where $R_7$ and $R_{10}$ are methyl, $R_8$ and $R_{11}$ are H and $R_9$ and $R_{12}$ are an alkyl having 10 to 12 carbon atoms. The compounds 2,5-di-t-amylhydroquinone and 2,5-di-t-butylhydroquinone are particularly desirable as shortstop agents of this invention. More than one hydroquinone may be used to shortstop a reaction.

The substituted hydroquinones of this invention are readily prepared by alkylation of hydroquinone according to the teachings of U.S. Pat. No. 2,832,808, which is hereby incorporated by reference. They are also prepared according to the teachings of U.S. Pat. No. 4,484,000, which is hereby incorporated by reference.

The amount of substituted hydroquinone used as a shortstop agent will vary depending on the desired effect on the polymerization reaction. It may be desirable to stop the polymerization reaction or one may wish to only slow the reaction. The amount used also depends on the type and amount of catalyst present. Normally the amount used is from about 0.0005 to about 0.0600 part by weight of shortstop agent per 100 parts by weight of monomer. For shortstopping a normal reaction, the amount used is from about 0.0025 to about 0.0100 part by weight per 100 parts by weight of monomer. Larger amounts may be necessary for emergency shortstopping. Smaller amounts may be used if one wishes to slow down the reaction without completely stopping the reaction. Amounts larger than 0.0600 part by weight per 100 parts by weight of monomer may be useful, if one wishes to stop the reaction and to further stabilize the polymer against color development.

In a vinyl chloride polymerization reaction, the typical amount of substituted hydroquinone necessary to stop the reaction is an amount of from about 0.0025 to about 0.0100 part by weight per 100 parts by weight of monomer. A substantial excess of shortstop agent is normally not necessary, but if more than the normal amount is added, it will do no harm since it is not necessary to remove the shortstop agent from the resin or polymer. Excess amounts of shortstop will function as a stabilizer for the polymer in later end use applications. The shortstop stabilizes the polymer by protecting against free radical attack.

While the shortstopping agent may be added to the reaction mixture as such, it may also be added as a mixture with an organic solvent such as an alcohol such as methanol and the like. Also, an aqueous dispersion can be prepared with the shortstop by using dispersants well known to those in the art. The shortstop can be added as an aqeuous dispersion. The shortstop can be added in the reactor at the end of the polymerization, or in the recovery stage such as blowdown tank, stipper and the like. Preferably the shortstop is added in the polymerization reactor after the desired degree of conversion is obtained. Of course, for emergency shortstopping the addition would occur in the polymerization reactor.

When polymerizing olefinic monomers by the suspension polymerization process, it is advantageous to add to the liquid reaction medium a small amount of a dispersant. The purpose of the dispersant is to obtain a more complete and uniform dispersal of the monomer(s) and catalyst(s) throughout the reaction medium prior to and during the polymerization of the monomer(s). Any of the well known dispersants operative in aqueous media may be employed. These include, among others, methyl cellulose, hydroxypropyl methyl cellulose, polyvinyl alcohol, dodecylamine hydrochloride, sodium lauryl sulfonate, lauryl alcohol, sorbitan monolaurate polyoxyethylene, nonylphenoxy polyoxyethylene ethanol, hydrolyzed polyvinyl acetates, polyacrylic acid polymers, polyethylene oxide containing surfactants and non-polyethylene oxide containing surfactants, etc. The amount of dispersant employed will be in the range of about 0.01% to about 1.0% by weight, based on the weight of the monomer(s), to give satisfactory results. Preferably, however, the dispersant is employed in the range of about 0.02% to about 0.15% by weight.

In aqueous suspension polymerization the reaction is usually conducted at a temperature in the range of about 0° C. to about 100° C. depending upon the particular monomer or monomers being polymerized. It is preferred, however, to employ temperatures in the range of about 40° C. to about 85° C., since, at these temperatures, polymers having the most all around beneficial properties are produced. This is particularly so in the case of making homopolymers and copolymers of vinyl chloride. The time of the reaction will vary from about 2 to about 15 hours. However, with the shortstopping agents of the present invention the reaction can be slowed down and stopped at any convenient point, such as just before the reaction "tailpeaks", that is, when the temperature of the reaction rises significantly above its set point. Also, runaway reactions can be avoided with the shortstopping agents of the present invention.

The suspension polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the suspension polymerization process may be carried out utilizing a full reactor technique. That is, the reaction vessel is filled to a predetermined level with the polymerization medium and kept that way during the course of the reaction cycle by constant addition thereto of water, or additional makeup liquid containing the monomer or monomers in the same proportion as at startup. When the desired conversion of monomer(s) to polymer is reached, which can be predetermined from the amount of liquid added to the reaction mixture, the reaction is terminated by the addition of the shortstopping agents of this invention. The necessity for the addition of liquid is due to the shrinkage in volume of the reaction medium produced by the conversion of the monomer(s) to the polymeric state.

The following specific examples are given by way of illustration of the invention and are not intended to be limitative. In the examples, all parts and percentages are by weight unless otherwise indicated. The examples are shown using a vinyl chloride polymerization reaction.

EXAMPLE I

This example is presented to show that 2,5-di-t-amylhydroquinone is a very effective shortstop agent in a modified suspension (thickened medium) polymerization of vinyl chloride which produces spherical shaped resins. The novel shortstop of this invention is compared with other known shortstops. The polymerization recipe employed was as follows:

| Ingredient | Parts by weight |
| --- | --- |
| Vinyl chloride | 100 |
| Water (demineralized) | 240 |
| Polyacrylic acid dispersant | 0.08 |
| Polyethylene oxide containing surfactant | 0.04 |
| Non-Polyethylene oxide containing surfactant | 0.04 |
| Di-secondary butyl peroxydicarbonate | 0.03 |
| Shortstop (variable) | 0.0075 |

The polymerization was conducted in a 3 liter reactor equipped with agitation. The polymerization was run at 57° C. with an agitation of 400 RPM. The shortstop was added after 6 hours as a 1% solution in methanol except in Run No. 3 which was added as an aqueous caustic solution. Seven different shortstop materials were evaluated in the above recipe against a control with no shortstop (Run 1). The results are reported in Table I. The effectiveness of the shortstop is indicated by the change in pressure with respect to time $-\Delta P/\Delta T$. That is a constant pressure with respect to time would give a $-\Delta P/\Delta T$ value of 0. This would indicate that there was no further conversion of monomer to polymer, in other words the reaction was stopped and the resin is stabilized against free radical attack.

TABLE I

| Run | Shortstop | $\frac{-\Delta P}{\Delta T}$ (psi/min) |
| --- | --- | --- |
| 1 | None (control) | 0.351 |
| 2 | Tetrabis methylene 3-(3,5'-di-tert-butyl-4'-hydroxyl phenyl)propionate methane | 0.358 |
| 3 | Acetone Thiosemicarbazone | 0.320 |
| 4 | α-methyl styrene | 0.310 |
| 5 | Bis phenol A | 0.244 |
| 6 | 2,6-di-t-butyl-4-methylphenol | 0.242 |
| 7 | 2,6-dimethylphenol | 0.094 |
| 8 | 2,5-di-t-amylhydroquinone | 0.01 |

As can be seen from the above results in Table I, of the materials evaluated, only the shortstop of this invention (Run 8) 2,5-di-t-amylhydroquinone was effective in stopping the polymerization. The other shortstops evaluated (Runs 2 through 7) are known shortstop agents for conventional suspension PVC processes, however, in the thickened medium suspension process, they do not work. Quite unexpectedly Run 8, 2,5-di-t-amylhydroquinone, was a very effective shortstop.

EXAMPLE II

This example is presented to show that the novel shortstops of this invention are effective in a conventional suspension PVC polymerization process. The polymerization recipe employed was as follows:

| Ingredient | Parts by weight |
| --- | --- |
| Vinyl Chloride | 100 |
| Water (demineralized) | 150 |
| Polyvinylalcohol surfactant | 0.08 |
| Hydroxyalkyl cellulose surfactant | 0.008 |
| Di-secondary butyl peroxydicarbonate | 0.03 |
| Shortstop (2,5-di-t-amylhydroquinone) | 0.0050 |

The polymerization was conducted in a 55 liter reactor with agitation. The reaction was run at 58° C. for 6 hours and then the shortstop was added. The change in pressure with respect to time $-\Delta P/\Delta T$ was 0.0 thus indicating that the polymerization reaction was completely stopped and the resin stabilized against free radical attack.

EXAMPLE III

This example is presented to show that Naugard 451 functions as a shortstop in the modified (thick medium) suspension process. The same recipe was used as in Example I except that Naugard 451 was used at the 0.0075 part by weight per 100 parts by weight of monomer as the shortstop. The reaction was conducted in a 55 liter reactor. The shortstop was added as a methanol solution as in Example I. The change in pressure with respect to time $-\Delta P/\Delta T$ was 0.1 psi/min, thus indicating the reaction was substantially stopped by the use of the shortstop.

Although the shortstop of this Example works, it is not as fast as the smaller molecule, 2,5-di-t-amylhydroquinone. It is believed that this is due to the faster diffusion rate expected for the smaller molecular weight.

EXAMPLE IV

This example is presented to show that 2,5-di-t-amylhydroquinone can be used to shortstop resin produced by the mass process. The recipe used was as follows:

| Ingredient | Parts by weight |
| --- | --- |
| Vinyl chloride | 100 |
| Peroxydicarbonate initiator | 0.03 |
| 2,5-di-t-amylhydroquinone (shortstop) | Variable |

The shortstop was added between 60% and 70% conversion. Four levels of shortstop were evaluated (0.0025, 0.0050, 0.0075 and 0.0100 part by weight). All four levels effectively stopped the reaction as indicated by a pressure drop. This is different than the suspension process where when the reaction is stopped the pressure remains constant. In the mass process, if the exothermic reaction is stopped, the temperature decreases, thereby lowering the pressure. In the control with no shortstop, the pressure did not drop.

The resin produced in this Example was stripped and dried in the same vessel as where polymerization occurred. Mass process resin shortstopped by this invention is substantially free of initiator. The shortstop reacts with the initator thus stabilizing the resin against free radical attack.

EXAMPLE V

This example is presented to show that 2,5-di-t-amylhydroquinone will effectively shortstop a low porosity resin. Low porosity resins are normally produced at a higher reaction temperature. The following recipe was used:

| Ingredient | Parts by weight |
| --- | --- |
| Vinyl Chloride | 100 |
| Water (demineralized) | 150 |
| Polyvinylalcohol dispersant | 0.1 |
| Hydroxy alkyl cellulose dispersant | 0.1 |
| Peroxy ester initiator | 0.05 |
| 2,5-di-t-amylhydroquinone (shortstop) | 0.005 |

The reaction was run in a 55 liter reactor at 82° C. The resin porosity was 0.1 as measured by DOP adsorption, which is a low porosity resin. The $-\Delta P/\Delta T$ was 0, indicating that the reaction was completely stopped by the use of 0.005 part by weight of 2,5-di-t-amylhydroquinone, and the resin is stabilized against free radical attack.

It is believed that the ability of the shortstops of this invention to function in thickened mediums and low porosity resins is due to the ability of the shortstop to diffuse through the medium and into the resin very quickly.

The response time of the shortstops of this invention is less than two minutes after injection, which is very fast. This fast response time makes them suitable for emergency shortstops as well as routine shortstop applications.

The polymer recovered from the runs in these examples was suitable for use in end use products such as pipe, house siding, film and molded items. Polyvinyl chloride resins produced with the shortstop agents of this invention also have improved heat stability.

The present invention has numerous advantages. For example, the shortstopping agents of the present invention are non-toxic materials (2,5-di-t-amylhydroquinone is approved by the U.S. Food and Drug Administration for food contact) which alleviate much of the early color development problems in the finished resin or polymer. In the event of a power failure during production of the polymer the shortstopping agent can be added immediately to slow down and terminate the polymerization thus eliminating possible "run-away" reactions along with potentially hazardous results. Other advantages will be apparent to those skilled in the art.

While the present invention has been described in terms of its specific embodiments, certain modifications and equivalents will be apparent to those skilled in the art and are intended to be included within the scope of the appended claims.

I claim:

1. A process for controlling the aqueous suspension homopolymerization of vinyl chloride and the aqueous suspension copolymerization of vinyl chloride with one or more copolymerizable olefinic monomers having a terminal $CH_2=C<$ grouping in the presence of a free radical yielding catalyst(s) and from about 0.01% to about 1.0% by weight, based on the total weight of monomer, of dispersant, comprising adding to the polymerization mixture containing vinyl chloride and said catalyst(s) from about 0.0005 part by weight to about 0.0600 part by weight per 100 parts by weight of monomer of a 2,5 substituted hydroquinone shortstop agent having the formula:

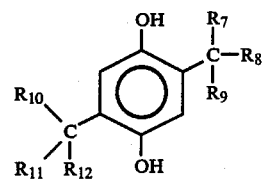

wherein $R_7$, $R_8$, $R_{10}$ and $R_{11}$ are identical or different and are either H, methyl, or ethyl; $R_9$ and $R_{12}$ are identical or different and are either H, or an alkyl having from 1 to about 12 carbon atoms.

2. A process of claim 1 wherein $R_7$, $R_8$, $R_{10}$ and $R_{11}$ are methyl; and $R_9$ and $R_{12}$ are either methyl or ethyl.

3. A process of claim 1 wherein said process is conducted in a thickened aqueous suspension.

4. A process for shortstopping the aqueous suspension homopolymerization of vinyl chloride comprising adding to the aqueous suspension mixture containing poly(vinylchloride) resin from about 0.0005 part by weight to about 0.0600 part by weight per 100 parts by weight of vinyl chloride of a 2,5 substituted hydroquinone shortstop agent having the formula:

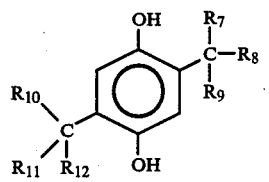

wherein $R_7$, $R_8$, $R_{10}$ and $R_{11}$ are identical or different and are either H, methyl, or ethyl; $R_9$ and $R_{12}$ are identical or different and are either H, or an alkyl having from 1 to about 12 carbon atoms, and wherein the level of dispersant in the aqueous suspension mixture is from about 0.01% to about 1.0% by weight of the weight of the weight of vinyl chloride.

5. A process of claim 4 wherein $R_7$, $R_8$, $R_{10}$ $R_{11}$ are methyl; and $R_9$ and $R_{12}$ are either methyl or ethyl.

6. A process of claim 4 wherein the amount of shortstop agent used in from about 0.0025 part by weight to about 0.0100 part by weight said parts by weight based on 100 parts by weight of vinyl chloride monomer.

7. A process of claim 5 wherein said shortstop agent is selected from the group consisting of 2,5-di-t-amylhydorquinone and 2,5-di-t-butylhydroquinone.

8. A process of claim 4 wherein said short stop agent is added to said polymerization mixture in the form of an organic solution.

9. A process of claim 4 wherein said shortstop agent is added to said polymerization mixture in the form of an aqueous dispersion.

10. A process of claim 4 wherein said process is conducted in a thickned aqueous suspension.

11. A process of claim 4 wherein said shortstop agent is added to the resin in the polymerization reactor.

12. A process of claim 4 wherein said shortstop agent is added to the resin after removal from the polymerization reactor but before the resin is dry.

13. A process for emergency shortstopping a free radical initiated aqueous suspension polymerization reaction of vinyl chloride with up to 50% by weight of one or more other polymerizable monomers wherein said polymerization reaction is stopped prior to the desired conversion of monomer to polymer; said process comprising adding to the polymerization reaction mixture from about 0.0200 part by weight to about 0.0600 part by weight per 100 parts by weight of monomer of at least one 2,5 substituted hydroquinone having the formula:

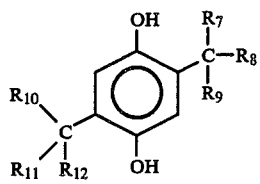

wherein $R_7$, $R_8$, $R_{10}$ and $R_{11}$ are identical or different and are either H, methyl, or ethyl; $R_9$ and $R_{12}$ are identical or different and are either H, or an alkyl having from 1 to about 12 carbon atoms, and wherein the level of dispersant in the polymerizaiton reaction mixture is from about 0.01% to about 1.0% by weight of the total weight of monomers.

14. A process of claim 13 wherein $R_7$, $R_8$, $R_{10}$ and $R_{11}$ are methyl; and $R_9$ and $R_{12}$ are either methyl or ethyl.

15. A process for controlling the mass homopolymerizaiton of vinyl chloride and the mass copolymerization of vinyl chloride with one or more copolymerizable olefinic monomers having a terminal $CH_2=C<$ grouping in the presence of a free radical yielding catalyst(s) comprising adding to the polymerization mixture containing said monomer(s) and said catalyst(s) from about 0.0005 part by weight to about 0.0600 part by weight per 100 parts by weight of monomer(s) of at least one 2,5 substituted hydroquinone shortstop agent having the formula:

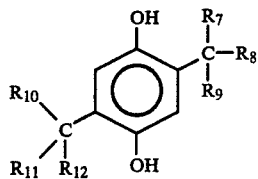

wherein $R_7$, $R_8$, $R_{10}$ and $R_{11}$ are identical or different and are either H, methyl, or ethyl; $R_9$ and $R_{12}$ are identical or different and are either H, or an alkyl having from 1 to about 12 carbon atoms.

16. A process of claim 15 wherein $R_7$, $R_8$, $R_{10}$ and $R_{11}$ are methyl; and $R_9$ and $R_{12}$ are either methyl or ethyl.

17. A process of claim 16 wherein said shortstop agent is selected from the group consisting of 2,5-di-t-amylhydroquinone and 2,5-di-t-butylhydroquinone.

18. A process of claim 15 wherein all the monomer is vinyl chloride.

19. A process of claim 18 wherein the catalyst is a peroxydicarbonate catalyst.

* * * * *